(12) United States Patent
Eo et al.

(10) Patent No.: US 7,355,589 B2
(45) Date of Patent: Apr. 8, 2008

(54) ALPHABET INPUT APPARATUS AND ALPHABET INPUT METHOD

(75) Inventors: Yoon-Young Eo, Seou (KR); Jang-Sung Choi, Gunpo-shi (KR)

(73) Assignee: Timespace Systems Co., Ltd., Seoul (KR)

( * ) Notice: Subject to any disclaimer, the term of this patent is extended or adjusted under 35 U.S.C. 154(b) by 394 days.

(21) Appl. No.: 10/530,037

(22) PCT Filed: Oct. 28, 2003

(86) PCT No.: PCT/KR03/02283

§ 371 (c)(1),
(2), (4) Date: Aug. 23, 2005

(87) PCT Pub. No.: WO2004/040883

PCT Pub. Date: May 13, 2004

(65) Prior Publication Data

US 2006/0101070 A1    May 11, 2006

(30) Foreign Application Priority Data

Oct. 30, 2002    (KR) ...................... 10-2002-0066454

(51) Int. Cl.
*G09G 5/00*     (2006.01)
*G06F 3/02*     (2006.01)
(52) U.S. Cl. ........................ 345/168; 341/22
(58) Field of Classification Search ............ 341/22–26; 345/168–172
See application file for complete search history.

(56) References Cited

U.S. PATENT DOCUMENTS 5,619,563 A     4/1997  Hsiao 6,636,162 B1 *  10/2003  Kushler et al. ................ 341/28

FOREIGN PATENT DOCUMENTS

| KR | 10-1999-0055053 | 12/1999 |
| KR | 10-2000-0085068 | 12/2000 |
| KR | 10-2000-0085136 | 12/2000 |
| KR | 2001-54288      | 7/2001 |
| KR | 10-2000-0022784 | 11/2001 |
| KR | 2001-98105      | 11/2001 |
| KR | 10-2002-0017228 | 3/2002 |
| KR | 2002-53784      | 7/2002 |
| KR | 2002-55883      | 7/2002 |

OTHER PUBLICATIONS

International Search Report, International Preliminary Examination Report.

* cited by examiner

*Primary Examiner*—Alexander Eisen
*Assistant Examiner*—Hoai-Quan T Ho
(74) *Attorney, Agent, or Firm*—Harness, Dickey & Pierce, P.L.C.

(57) ABSTRACT

Alphabet input apparatus and method are provided. In the alphabet input apparatus, one alphabet is determined by pressing two keys of a keypad to which ten basic figures made by analyzing shapes of alphabets are allocated respectively. Further, each alphabet corresponds to a combination of two keys depending on the order of handwriting the alphabet. Thus, the user can conveniently input alphabets with the same manner as a Korean handwriting manner without memorizing the key arrangement. Since the user can input all alphabets using limited keys, the alphabet input apparatus may be used as a small-sized keyboard or keypad in small-sized and multi-function electronic equipments such as a mobile phone.

10 Claims, 6 Drawing Sheets

Fig. 1

(PRIOR ART)

| Basic Figure | Related Characters | | Meaning |
|---|---|---|---|
| N | A, N, M | ∧ | ∧ Element, N Element, or Character N of Related Characters |
| — | A, E, F, L, T | — | — Horizontal Element of Related Characters |
| P | B, F, H, P, R | ⊢ | ⊢ Element, P Element, or Character P of Related Characters |
| C | C, E, G, K, S, X | C (or <) | C (or <) Element, or Character C of Related Characters |
| I | D, H, I, K, L, T, U | I | I Vertical Element, or Character I of Related Characters |
| ⊃ | B, D, S | ⊃ | ⊃ Element of Related Characters |
| \ | M, Q, R, V, W, X, Y | \ | \ Element of Related Characters |
| O | O, U, Y | ∪ | ∪ Element, or Character O of Related Characters |
| Z | X, Z | / | / Element, or Character Z of Related Characters |
| J | G, J, Y | J | J Element, or Character J of Related Characters |

Fig. 4

| Input Signal Permutation | Corresponding Character | Input Signal Permutation | Corresponding Character |
|---|---|---|---|
| $^1N$ + $^2-$ | A | $^8O$ + $^8O$ | O |
| $^3P$ + $^6\supset$ | B | $^3P$ + $^3P$ | P |
| $^4C$ + $^4C$ | C | $^8O$ + $^7\backslash$ | Q |
| $^5I$ + $^6\supset$ | D | $^3P$ + $^7\backslash$ | R |
| $^4C$ + $^2-$ | E | $^4C$ + $^6\supset$ | S |
| $^2-$ + $^3P$ | F | $^2-$ + $^5I$ | T |
| $^4C$ + $^0J$ | G | $^8O$ + $^5I$ | U |
| $^3P$ + $^5I$ | H | $^7\backslash$ + $^9Z$ | V |
| $^5I$ + $^5I$ | I | $^7\backslash$ + $^1N$ | W |
| $^0J$ + $^0J$ | J | $^9Z$ + $^7\backslash$ | X |
| $^5I$ + $^4C$ | K | $^6\supset$ + $^4C$ | |
| $^5I$ + $^2-$ | L | $^7\backslash$ + $^0J$ | Y |
| $^1N$ + $^7\backslash$ | M | $^8O$ + $^0J$ | |
| $^1N$ + $^1N$ | N | $^9Z$ + $^9Z$ | Z |

Fig. 5

| Input Signal Permutation | Corresponding Character | Input Signal Permutation | Corresponding Character |
|---|---|---|---|
| $^4C + {}^7\backslash$ | a | $^1N + {}^1N$ | n |
| $^5I + {}^6\supset$ | b | $^5I + {}^1N$ | |
| $^4C + {}^4C$ | c | $^8O + {}^8O$ | o |
| $^4C + {}^5I$ | d | $^3P + {}^3P$ | p |
| $^2- + {}^4C$ | e | $^4C + {}^9Z$ | q |
| $^4C + {}^2-$ | | $^5I + {}^9Z$ | r |
| $^9Z + {}^2-$ | f | $^4C + {}^6\supset$ | s |
| $^0J + {}^2-$ | | $^2- + {}^5I$ | t |
| $^4C + {}^0J$ | g | $^8O + {}^5I$ | u |
| $^3P + {}^5I$ | h | $^7\backslash + {}^9Z$ | v |
| $^5I + {}^5I$ | i | $^8O + {}^2-$ | |
| $^0J + {}^0J$ | j | $^7\backslash + {}^1N$ | w |
| $^5I + {}^4C$ | k | $^9Z + {}^7\backslash$ | x |
| $^3P + {}^7\backslash$ | | $^6\supset + {}^4C$ | |
| $^0J + {}^7\backslash$ | l | $^7\backslash + {}^0J$ | y |
| $^1N + {}^5I$ | m | $^8O + {}^0J$ | |
| $^1N + {}^7\backslash$ | | $^9Z + {}^9Z$ | z |

Fig. 6

ALPHABET INPUT APPARATUS AND ALPHABET INPUT METHOD

TECHNICAL FIELD

The present invention relates to a character input apparatus and a character input method. More specifically, the present invention is directed to an alphabet input apparatus and an alphabet input method.

BACKGROUND ART

In recent years, marvelous advance in internet enables English to hold a dominant position as universal language. Therefore, it is inevitable to use English in daily life. English is a kind of ideogram, in which 26 alphabet characters are combined to make meaningful words. A standard computer keyboard is widely being used as a representative character input apparatus. In a computer keyboard for inputting English Alphabet, each of 26 alphabets is allocated to each key. Therefore, when keys of alphabets corresponding to the order of a word are pressed, the alphabets are displayed according to the order by a simple program. However, the keyboard occupies a considerable space and is limited in movability due to keys corresponding to 26 alphabets.

With rapid advance in electric and electronic technologies, various electronic equipments such as mobile phones adopting CDMA, PCS, TDMA, GSM, AMPS, and IMT-2000, a PDA, a pager, a small-sized game machine, a remote controller, a camera, and home electronic appliances trench toward small-sized and high-tech. As functions of the electronic equipment have been improved while trending toward small-sized and desire for imputing characters to the electronic equipment have been increased, a necessity for inputting characters is continuously increasing.

A conventional computer keyboard is not applicable to electronic equipments whose buttons (keys) must be limited in number. Therefore, there has been used a method (apparatus) in which two or three alphabets are allocated to one key and one alphabet is decided in response to the times of pressing a specific key within a predetermined time.

Figure 1:
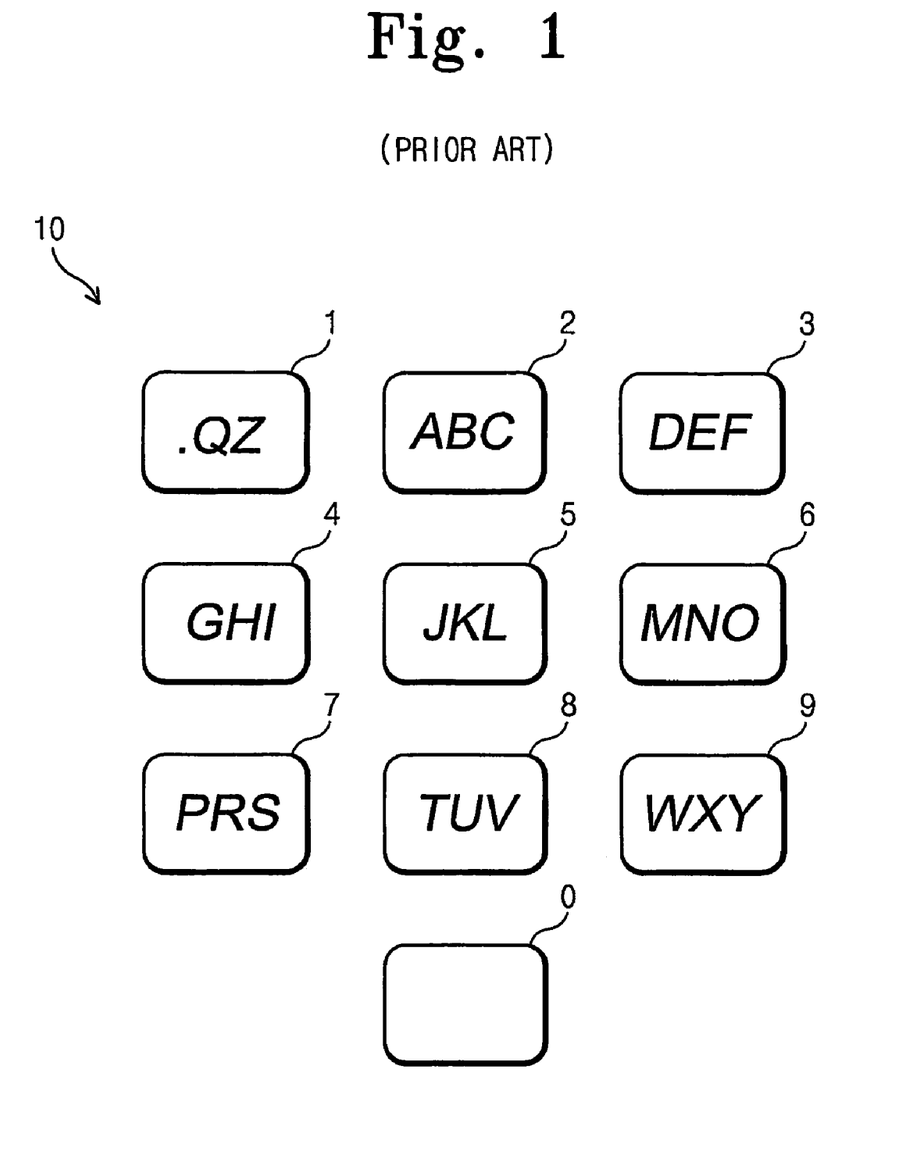
FIG. 1 illustrates a key matrix according to a conventional key input method.

A conventional cell phone keypad 10 for inputting alphabets is illustrated in FIG. 1. The keypad 10 has nine keys to which two or three alphabets are allocated respectively. That is, alphabets Q and Z are allocated to a key 1; alphabets A, B, and C are allocated to a key 2; alphabets D, E, and F are allocated to a key 3; alphabets G, H, and I are allocated to a key 4; alphabets J, K, and L are allocated to a key 5, alphabets M, N, and O are allocated to a key 6; alphabets P, R, and S are allocated to a key 7; alphabets T, U, and V are allocated to a key 8; and alphabets W, X, and Y are allocated to a key 9.

For example, if a user wants to input the alphabet A, he/she presses the key 2 once. If the user wants to input the alphabet B, he/she presses the key 2 twice. If the user wants to input the alphabet C, he/she presses the key 2 three times. To successively input alphabets allocated to the same key, the user must press a function key such as, for example, a key 0 between input-desire alphabets. That is, to successively input the alphabets A and B, the user presses the key 2 once to input the alphabet A and then presses the function key 0 to move a position. Finally, the user successively presses the key 2 to input the alphabet C.

For example, in a case where a user wants to input a word "CLING", he/she successively presses the key 2 three times to input the alphabet C and then successively presses the key 5 three times to input the alphabet L. Thereafter, he/she successively presses the key 4 three times to input the alphabet I and then successively presses the key 6 twice to input the alphabet N. Finally, he/she presses the key 4 once to input the alphabet G.

However, there is no relationship between alphabets allocated to one key and there is no logicality between a specific alphabet and the times of pressing a key for the specific alphabet. Therefore, a user must know where a desired alphabet is allocated, how many press a key for the desired alphabet, and whether the desired alphabet is correctly inputted. As a result, the user must concentrate his/her attention to use of the foregoing alphabet input apparatus. Further, the user encounters inconvenience of pressing a lot of keys and increase in time so as to input an alphabet.

Thus, a feature of the present invention is to provide alphabet input apparatus and method for inputting all alphabets with the similar manner to a handwriting manner.

DISCLOSURE OF INVENTION

According an aspect of the present invention, an alphabet input apparatus comprises a key input part having input keys on which predetermined number of basic figures extracted by analyzing shapes of alphabet capital letters are engraved, a database part for storing alphabet information coded by a combination of two input key code values sequentially generated by the key input part, and a character determination part for, when a code value is received from the key input part, sequentially extracting respective two input key code values to determine an alphabet corresponding to a permutation of the extracted code values from the alphabet information stored in the database part.

The alphabet input apparatus further comprises a character display part for displaying an alphabet determined at the character determination part.

In one embodiment, the key input part has 10 input keys on which 10 basic figures are engraved respectively. The 10 basic figures may have any shapes. Preferably, a combination of two basic figures is very similar to an alphabet capital letter shape. Thus, a user can conveniently input alphabets with the same manner as a handwriting manner.

For example, the basic figures allocated to the 10 input keys are preferably N, -, P, C, ⌐, ⊃, \, ○, Z, and J.

The database part stores information for coding a permutation of a code value, generated by the pressing order of two keys, into an alphabet character.

For example, the database part stores information for coding alphabet capital letters. That is, the database part stores information:

coding an alphabet capital letter "A" by a permutation of code values N and -;

coding an alphabet capital letter "B" by a permutation of code values P and ⊃;

coding an alphabet capital letter "C" by a permutation of code values C and C;

coding an alphabet capital letter "D" by a permutation of code values ⌐ and ⊃;

coding an alphabet capital letter "E" by a permutation of code values C and -;

coding an alphabet capital letter "F" by a permutation of code values - and P;

coding an alphabet capital letter "G" by a permutation of code values C and J;

coding an alphabet capital letter "H" by a permutation of code values P and ⌐;

coding an alphabet capital letter "I" by a permutation of code values *I* and *I*;

coding an alphabet capital letter "J" by a permutation of code values J and J;

coding an alphabet capital letter "K" by a permutation of code values *I* and C;

coding an alphabet capital letter "L" by a permutation of code values *I* and -;

coding an alphabet capital letter "M" by a permutation of code values N and \;

coding an alphabet capital letter "N" by a permutation of code values N and N;

coding an alphabet capital letter "O" by a permutation of code values O and O;

coding an alphabet capital letter "P" by a permutation of code values P and P;

coding an alphabet capital letter "Q" by a permutation of code values O and \;

coding an alphabet capital letter "R" by a permutation of code values P and \;

coding an alphabet capital letter "S" by a permutation of code values C and Ɔ;

coding an alphabet capital letter "T" by a permutation of code values - and *I*;

coding an alphabet capital letter "U" by a permutation of code values O and *I*;

coding an alphabet capital letter "V" by a permutation of code values \ and Z; coding an alphabet capital letter "W" by a permutation of code values \ and N;

coding an alphabet capital letter "X" by a permutation of code values Z and \ or a permutation of code values Ɔ and C;

coding an alphabet capital letter "Y" by a permutation of code values \ and J or a permutation of code values O and J; and coding an alphabet capital letter "Z" by a permutation of code values Z and Z.

Further, the database part stores information:

coding an alphabet small letter "a" by a permutation of code values C and \;

coding an alphabet small letter "b" by a permutation of code values *I* and Ɔ;

coding an alphabet small letter "c" by a permutation of code values C and C;

coding an alphabet small letter "d" by a permutation of code values C and *I*;

coding an alphabet small letter "e" by a permutation of code values - and C;

coding an alphabet small letter "f" by a permutation of code values Z and - or a permutation of code values J and -;

coding an alphabet small letter "g" by a permutation of code values C and J;

coding an alphabet small letter "h" by a permutation of code values P and *I*;

coding an alphabet small letter "i" by a permutation of code values *I* and *I*;

coding an alphabet small letter "j" by a permutation of code values J and J;

coding an alphabet small letter "k" by a permutation of code values *I* and C or a permutation of code values P and \;

coding an alphabet small letter "l" by a permutation of code values J and \;

coding an alphabet small letter "m" by a permutation of code values N and *I* or a permutation of code values N and \;

coding an alphabet small letter "n" by a permutation of code values N and N or a permutation of code values *I* and N;

coding an alphabet small letter "o" by a permutation of code values O and O;

coding an alphabet small letter "p" by a permutation of code values P and P;

coding an alphabet small letter "q" by a permutation of code values C and Z;

coding an alphabet small letter "r" by a permutation of code values *I* and Z;

coding an alphabet small letter "s" by a permutation of code values C and Ɔ;

coding an alphabet small letter "t" by a permutation of code values - and *I*;

coding an alphabet small letter "u" by a permutation of code values O and *I*;

coding an alphabet small letter "v" by a permutation of code values \ and Z or a permutation of code values O and -;

coding an alphabet small letter "w" by a permutation of code values \ and N;

coding an alphabet small letter "x" by a permutation of code values Z and \ or a permutation of code values Ɔ and C;

coding an alphabet small letter "y" by a permutation of code values \ and J or a permutation of code values O and J; and coding an alphabet small letter "z" by a permutation of code values Z and Z.

Preferably, the key input part further includes a shift key for shifting a capital letter to a small letter. In this case, the database part stores the alphabet capital letter coding information as well as the alphabet small letter coding information.

According to another aspect of the invention, an alphabet input method comprises generating first and second input key code values from input keys to which predetermined number of basic figures extracted by analyzing shapes of alphabet capital letters are allocated respectively, setting a generation order of the two input key code values by a permutation of an input key code value, and determining an alphabet corresponding to a permutation of an input key code value generated from the input keys by reference to alphabet information coded by the permutation of the two input key code values.

The key input part has 10 input keys to which 10 basic figures are allocated, respectively. Under the principle that a code value of two input keys corresponds to an alphabet character, the 10 basic figures may have any shape. Preferably, the 10 basic figures are extracted by analyzing alphabet shapes.

For example, the basic figures are N, -, P, C, *I*, Ɔ, \, O, Z, and J.

BEST MODE FOR CARRYING OUT THE INVENTION

The present invention relates to an alphabet input apparatus and an alphabet input method. According to the invention, basic figures extracted by analyzing shapes of alphabet capital letters "A~Z" are allocated to input keys. Permutations of input key code values generated from two keys among the input keys to which the basic figures are allocated, correspond to the alphabets "A~Z (or a~z)". Therefore, although the basic figures may have any shapes, their combinations are preferably similar to alphabets. Additionally, reduction in the number of input keys coincides with a trend in miniaturization of electronic appliances.

Figure 2:
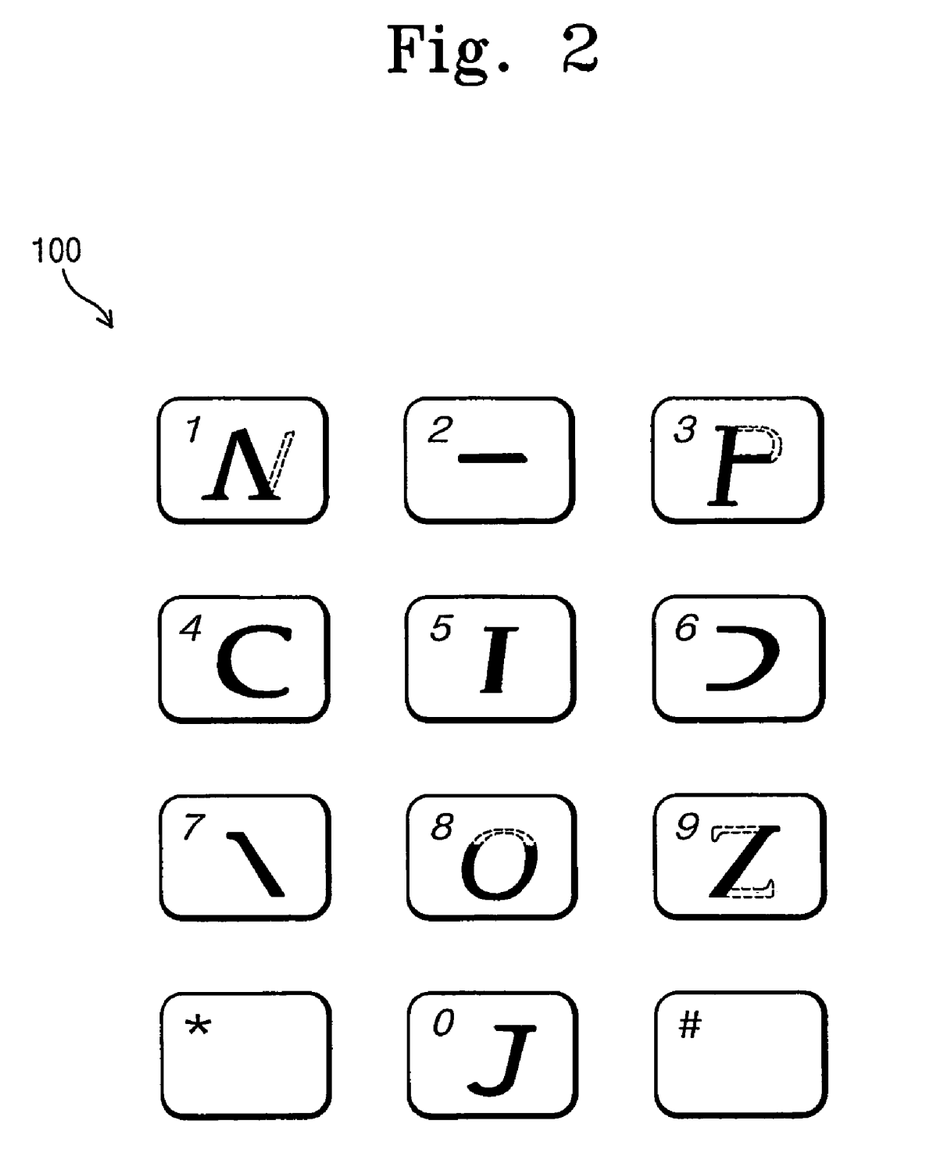
FIG. 2 illustrates a key matrix according to a key input method of the present invention.

In a preferred embodiment, basic figures according to the present invention are illustrated in FIG. 2. FIG. 2 shows a character input part to which the basic figures are allocated. Such a character input part is very usefully employed to portable communication apparatuses such as a cellular phone, a personal digital assistant (PDA), and so forth.

Referring to FIG. 2, the character input part 100 has input keys 0~9 to which at least ten basic figures are allocated.

A basic figure N is allocated to the input key 1, a basic figure - is allocated to the input key 2, a basic figure P is allocated to the input key 3, a basic figure C is allocated to the input key 4, a basic figure I is allocated to the input key 5, a basic figure ⊃ is allocated to the input key 6, a basic figure \ is allocated to the input key 7, a basic figure O is allocated to the input key 8, a basic figure - is allocated to the input key 9, a basic figure J is allocated to the input key 0. The input keys 0~9 may be variously arranged.

The input keys are sequentially pressed twice to determine one alphabet character. From FIG. 1, the N-allocated input key 1 and the - -allocated input key 2 are combined to associate the alphabet capital letter "A". Further, to sequentially press the input key 1 and the input key 2 is based on the order of handwriting the capital letter "A".

The input key 1, the input key 3, the input key 8, and the input key 9 are visually divided into two parts. For example, the two parts are discriminated using different colors or using a shadow in a case where they have the same colors. Undoubtedly, various methods may be used to discriminate the two parts. The input keys 1, 3, 8, 9 act as two basic figures according to an input-desire character. That is, combination of the two parts acts as one basic figure, and one part except the other part acts as another basic figure.

For example, the basic figure N allocated to the input key 1 may be visually divided into a part Λ and a part /. The basic figure N is associated with the alphabet "N" and a part Λ, except a part / from the basic figure N, is readily associated with a portion of the alphabet "A". This will be described in further detail later. Namely, if the input key 1 is successively pressed twice, a character "N" is displayed. If the \-allocated input key 7 is pressed after pressing the input key 1, the character "M" is displayed. If the --allocated input key 2 is pressed after pressing the input key 1, the character "A" is displayed.

Figure 3:
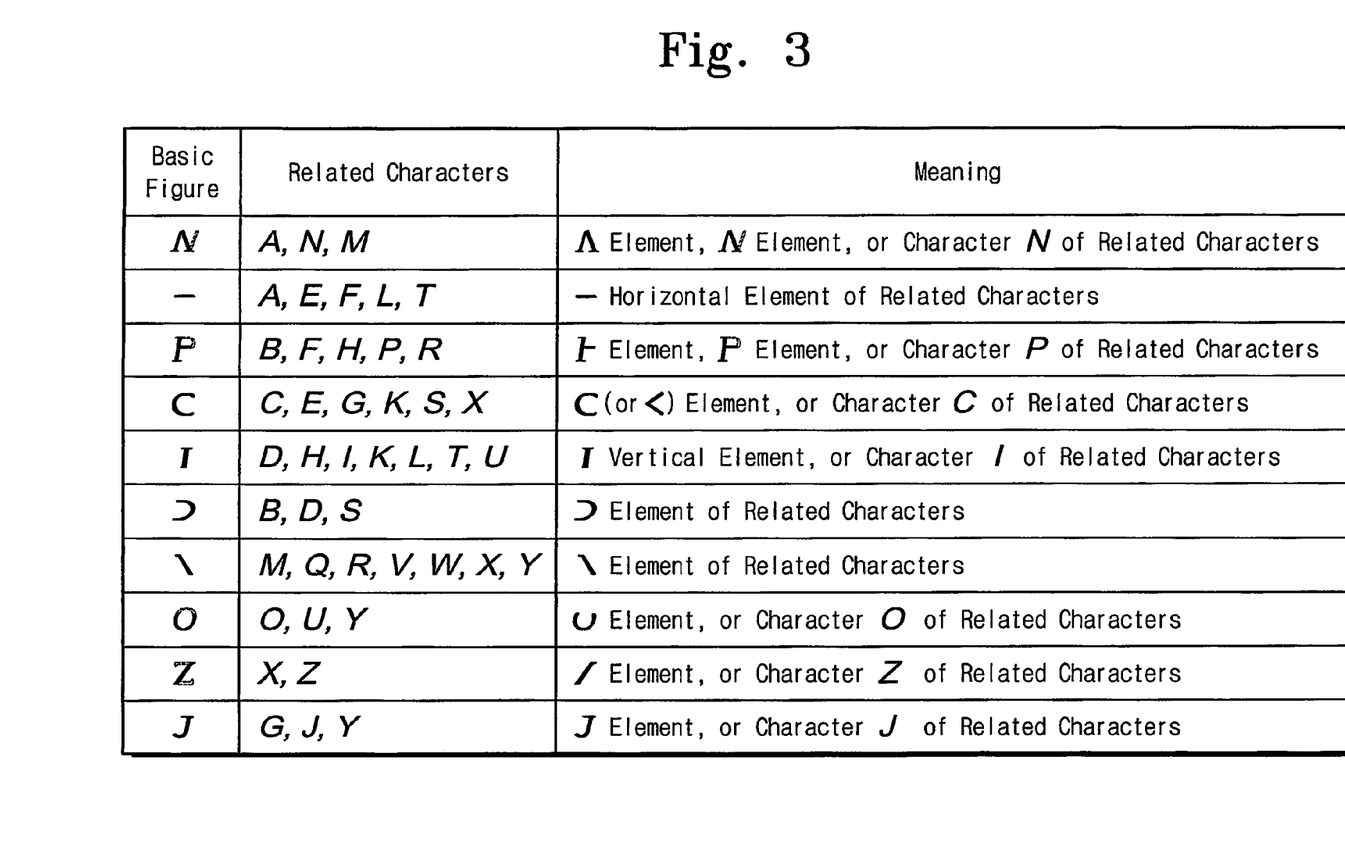
FIG. 3 illustrates alphabets related with basic figures engraved on keys shown in FIG. 2 and their meaning.

The meaning of the basic figures allocated to the input keys will now be described more fully with reference to FIG. 3. Referring to FIG. 3, the basic figure N allocated to the input key 1 means a common element Λ or N of alphabet capital letters "A, N, and M" or means the alphabet capital letter "N". The basic figure - means a common horizontal element - of alphabet capital letters "A, E, F, L, and T". The basic figure P allocated to the input key 3 means a common element P of alphabet capital letters "B, F, H, P, and R" or the alphabet "P". The basic figure C allocated to the input key 4 is common element C (or <) of alphabet capital letters "C, E, G, K, S, and X" or an alphabet "C". The basic figure I allocated to the input key 5 means a common element I of the alphabet capital letters "D, H, I, K, L, T, and U" or the alphabet "I". The basic figure ⊃ allocated to the input key 6 means a common element ⊃ of alphabet capital letters "B, D, and S". The basic figure \ allocated to the input key 7 means a common element \ of alphabet capital letters "M, Q, R, V, W, X, and Y". The basic figure O allocated to the input key 8 means a common element ∪ of alphabet capital letters "O, U, and Y" or the alphabet "O". The basic figure Z allocated to the input key 9 means a common element / of alphabet capital letters "X and Z" or the alphabet "Z". The basic figure J allocated to the input key 0 means a common element J of alphabet capital letters "G, J, and Y" or the alphabet "J".

In the present invention, database part stores corresponding information of permutations of consecutive two key signals (i.e., input key code value) of the figure-allocated key and the respective alphabets. The corresponding relationship between the permutation of the input key code values and the alphabet is determined according to an alphabet, a basic figure related with the alphabet, and a writing order of the alphabet. Specifically, it is preferably determined as shown in FIG. 4.

Figure 4:
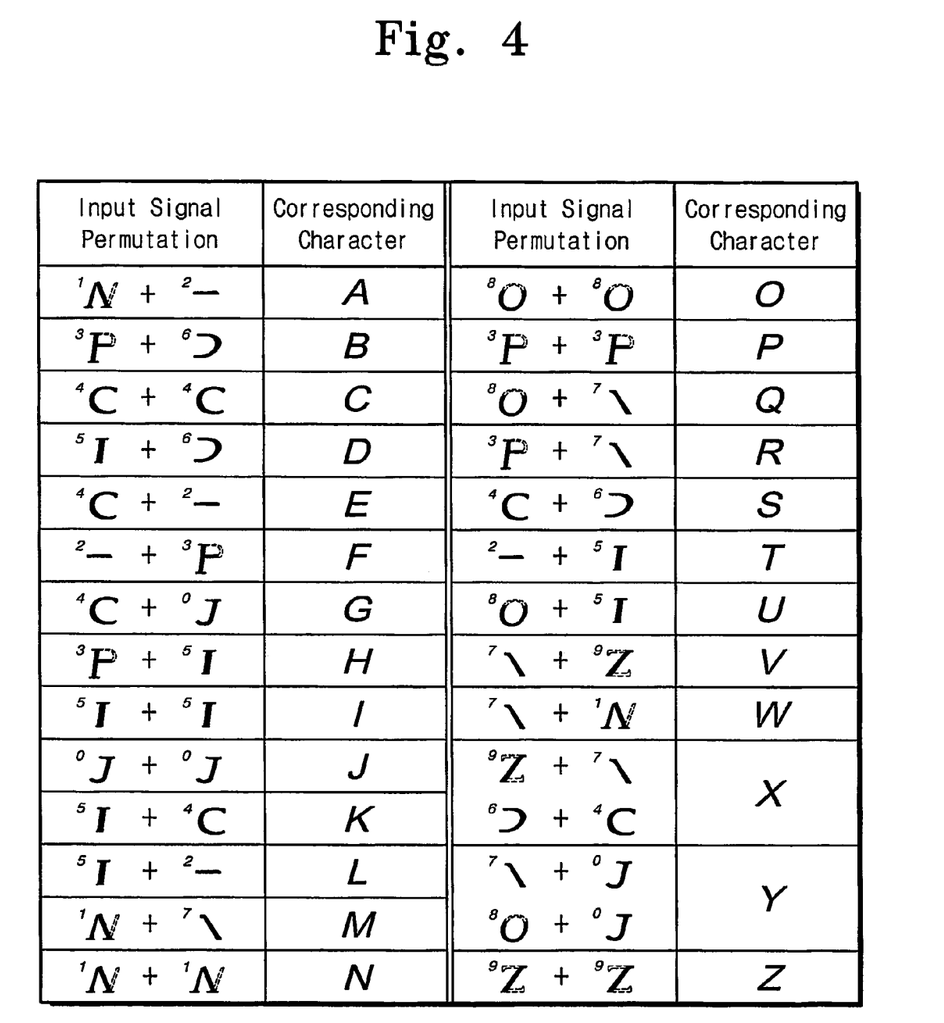
FIG. 4 illustrates an example where alphabet capital letters are allocated by combinations of the basic figures engraved on the keys shown in FIG. 2.

Permutations of two basic figures and alphabet capital letters coded by the permutations are illustrated in FIG. 4.

Referring to FIG. 4, if the input key 1 and the input key 2 are sequentially pressed (i.e., by the combination of the basic figures N and -), the alphabet capital letter "A" is coded. If the input key 3 and the input key 6 are sequentially pressed (i.e., by the combination of the basic figures P and ⊃), the alphabet capital letter "B" is coded. If the input key 4 and the input key 4 are sequentially pressed (i.e., if the input key 4 are successively pressed twice), the alphabet capital letter "A" is coded by the basic figure C. If the input key 5 and the input key 6 are sequentially pressed (i.e., by the combination of the basic figures I and ⊃), the alphabet capital letter "D" is coded. If the input key 4 and the input key 2 are sequentially pressed (i.e., by the combination of the basic figures C and -), the alphabet capital letter "E" is coded. If the input key 2 and the input key 3 are sequentially pressed (i.e., by the combination of the basic figures - and P), the alphabet capital letter "F" is coded. If the input key 4 and the input key 0 are sequentially pressed (i.e., by the combination of the basic figures C and J ), the alphabet capital letter "G" is coded. If the input key 3 and the input key 5 are sequentially pressed (i.e., by the combination of the basic figures P and I), the alphabet capital letter "H" is coded. If the input key 5 and the input key 5 are sequentially pressed twice (i.e., if the input key 5 are successively pressed twice), the alphabet capital letter "I" is coded by the basic figure I.

If the input key 0 and the input key 0 are sequentially pressed (i.e., if the input key 0 is successively pressed twice), the alphabet capital letter "J" is coded by the basic figure J. If the input key 5 and the input key 4 are sequentially pressed (i.e., by the combination of the basic figures *I* and C), the alphabet capital letter "K" is coded. If the input key 5 and the input key 2 are sequentially pressed (i.e., by the combination of the basic figures *I* and -), the alphabet capital letter "L" is coded. If the input key 1 and the input key 7 are sequentially pressed (i.e., by the combination of the basic figures N and \), the alphabet capital letter "M" is coded. If the input key 1 and the input key 1 are sequentially pressed (i.e., if the input key 1 are successively pressed twice), the alphabet capital letter "N" is coded by the basic figure N. If the input key 8 and the input key 8 are sequentially pressed (i.e., if the input key 8 are successively pressed twice), the alphabet capital letter "O" is coded by the basic figure O. If the input key 3 and the input key 3 are sequentially pressed (i.e., if the input key 3 are successively pressed twice), the alphabet capital letter "O" is coded by the basic figure P. If the input key 8 and the input key 7 are sequentially pressed (i.e., by the combination of the basic figures O and \), the alphabet capital letter "Q" is coded. If the input key 3 and the input key 7 are sequentially pressed (i.e., by the combination of the basic figures P and \), the alphabet capital letter "R" is coded. If the input key 4 and the input key 6 are sequentially pressed (i.e., by the combination of the basic figures C and Ɔ), the alphabet capital letter "S" is coded. If the input key 2 and the input key 5 are sequentially pressed (i.e., by the combination of the basic figures - and *I*), the alphabet capital letter "T" is coded. If the input key 8 and the input key 5 are sequentially pressed (i.e., by the combination of the basic figures O and *I*), the alphabet capital letter "U" is coded. If the input key 7 and the input key 9 are sequentially pressed (i.e., by the combination of the basic figures \ and Z), the alphabet capital letter "V" is coded. If the input key 7 and the input key 1 are sequentially pressed (i.e., by the combination of the basic figures \ and N), the alphabet capital letter "W" is coded. If the input key 9 and the input key 7 are sequentially pressed (i.e., by the combination of the basic figures Z and \) or if the input key 6 and the input key 4 are sequentially pressed (i.e., by the combination of the basic figures Ɔ and C), the alphabet capital letter "X" is coded. If the input key 7 and the input key 0 are sequentially pressed (i.e., by the combination of the basic figures \ and J) or if the input key 8 and the input key 0 are sequentially pressed (i.e., by the combination of the basic figures O and J), the alphabet capital letter "Y" is coded. If the input key 9 and the input key 9 are sequentially pressed (i.e., the input key 9 are successively pressed twice), the alphabet capital letter "Z" is coded by the basic figure Z.

The order of pressing the basic figures (input keys) is identical to the order of writing an alphabet small letter.

A person skilled in the art will readily add input keys or add separate functions to input keys so as to input special characters such as a quotation mark, a rest, a period, etc., shift Korean-English-Number input, shift from alphabet capital letters to alphabet small letters, make a space, and change to Deutsch umlaut.

For example, in a case where a capital-small shift key is added, the database part further stores corresponding information of the permutation of consecutive two key signals (i.e., input key code value) of a figure-allocated key (see FIG. 2) and respective alphabet small letters.

Figure 5:
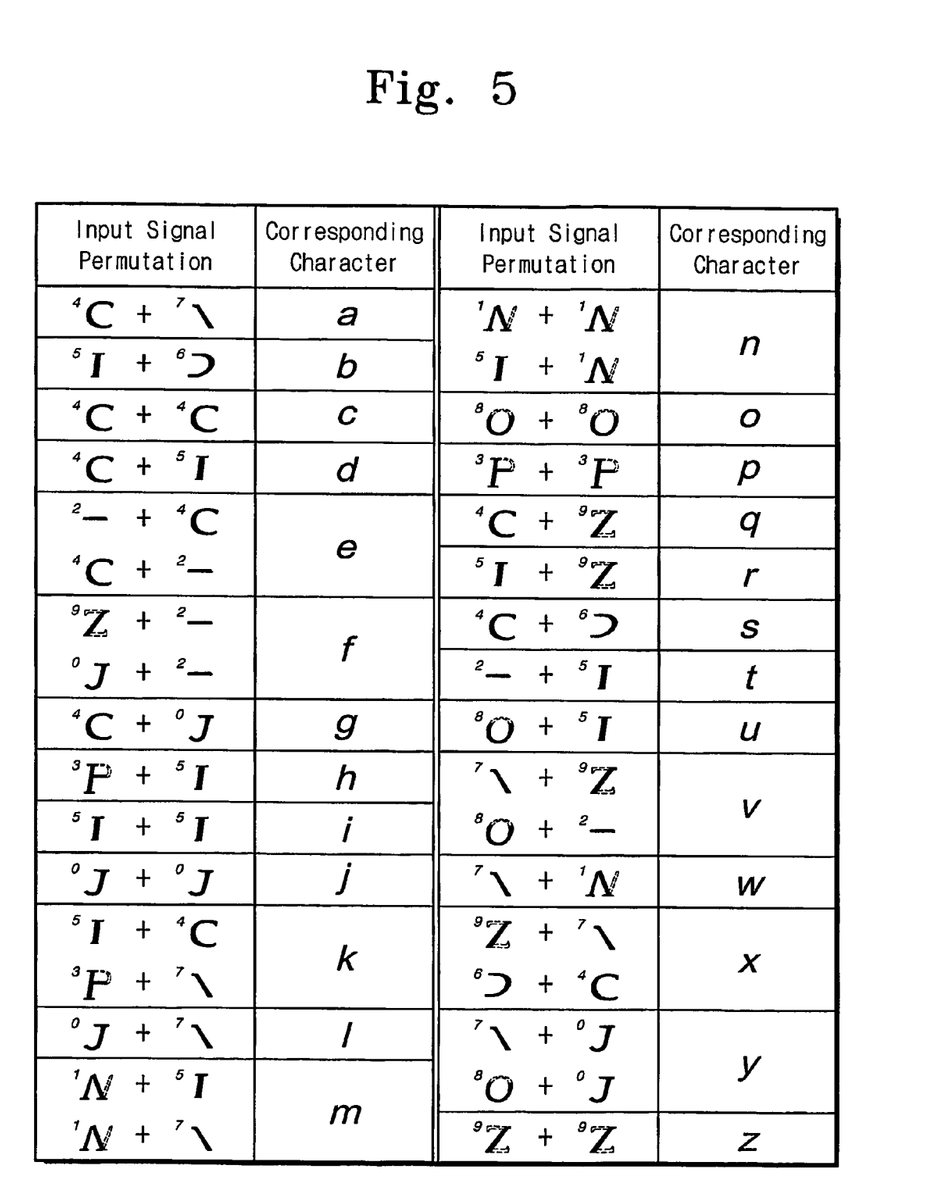
FIG. 5 illustrates an example where alphabet small letters are allocated by combinations of the basic figures engraved on the keys shown in FIG. 2.

Permutations of two basic figures and alphabet small letters coded by the permutations are illustrated in FIG. 5. Similar to the alphabet capital letters, a corresponding relationship between a permutation of input key code values and an alphabet is determined according to the alphabet, a basic figure related with the alphabet, and the order of writing the alphabet.

For example, if the input key 5 and the input key 6 are sequentially pressed, an alphabet small letter "b" is coded by the basic figures *I* and Ɔ. With reference to FIG. 5, coding the other small letters may be readily understood.

As previously stated, the alphabet input method offers it with the advantage that a key is always pressed twice by watching the basic figure engraved on a key (i.e., by visual intuition) to input an alphabet. Further, since the key input order is identical to an alphabet handwriting order, the alphabet may be inputted very easily.

Figure 6:
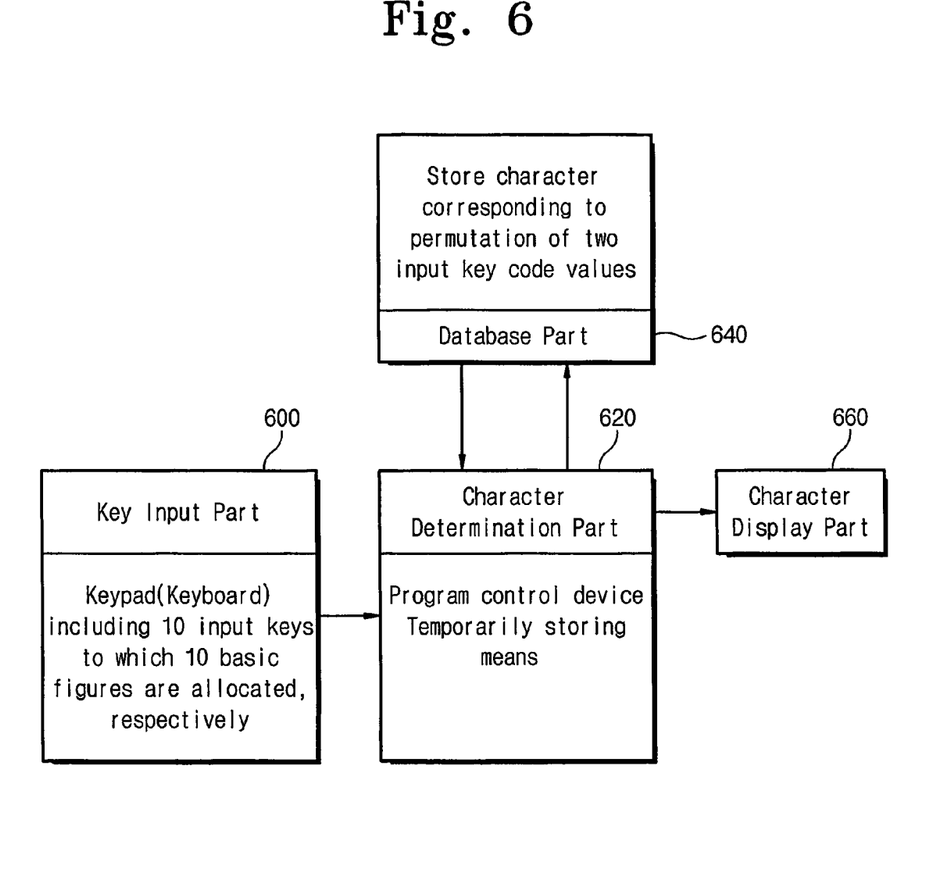
FIG. 6 illustrates the configuration of an exemplary apparatus adopting an alphabet input device according to the present invention.

The configuration of an exemplary apparatus adopting the alphabet input device according to the invention is illustrated in FIG. 6.

Referring to FIG. 6, an alphabet input apparatus includes a key input part 600, a character determination part 640, and a database part 640. The key input part 600 has a keypad (input key) including 10 input keys to which 10 basic figures are allocated, respectively. The database part 640 stores information on the alphabet adopting a permutation of two input key signals generated by the key input part 600 (a permutation of an input key code value) as a code. The character determination part 620 searches the information stored in the database part 640 to extract an alphabet corresponding to a permutation (code) of an input signal. If necessary, the input apparatus further includes means for temporarily storing a processing input signal, a character display device 660 for sequentially displaying determined alphabets, and so forth. The components of the alphabet input apparatus are merely divided in function, so that they may not be physically independent. For example, it will be understood that the database part 640 and the alphabet determination part 620 are fabricated by one monolithic program or part.

According to the present invention, two input keys are used to input one alphabet character. In a case where the second input key is mistakenly pressed (i.e., there is no alphabet character made by a combination of the first input key and the second input key), only the second input key is pressed, not pressing two input keys corresponding to a reinput-desire character. That is, in a case where there is no matching alphabet character, a code value generated by the second input key is discarded and the corresponding character is determined by the combination of a regenerated code value and a code value generated when an input key is initially pressed.

An alarm system may be added for coping with an abnormal case that, for example, a key signal which does not correspond to an alphabet is inputted or the next key input signal is not inputted for predetermined time after odd-numbered key input. When the abnormal case occurs, the alarm system alarms a user to use the alphabet input apparatus correctly. Further, in the stage of deciding an alphabet, a person skilled in the art readily adds a function to automatically recognize a directly presenting alphabet following an initially inputted alphabet and a period as a capital letter and recognize the others as small letters.

INDUSTRIAL APPLICABILITY

According to the presently invented alphabet input method and apparatus, one alphabet is determined by pressing two keys of a keypad to which ten basic figures made by analyzing shapes of alphabets are allocated. Further, each alphabet corresponds to a combination of two keys depending on the order of handwriting the alphabet. Thus, the user can conveniently input alphabets with the same manner as a Korean handwriting manner without memorizing the key arrangement. Since the user can input all alphabets using limited keys, the alphabet input apparatus may be used as a small-sized keyboard or keypad in small-sized and multi-function electronic equipments such as a mobile phone.

What is claimed is:

1. An alphabet input apparatus comprising: a key input part having input keys on which predetermined number of 10 basic symbols N, -, P, C, ɾ, ɔ, \, o, z, and J extracted by analyzing shapes of alphabet capital letters are engraved; a data base part for storing alphabet information coded by a combination of two input key code values sequentially generated by the key input part; and a character determination part for, when a code value is received from the key input part, sequentially extracting respective two input key code values to determine an alphabet corresponding to a permutation of the extracted code values from the alphabet information stored in the database part.

2. The alphabet input apparatus of claim 1, further comprising a character display part for displaying an alphabet determined at the character determination part.

3. The alphabet input apparatus of claim 1, wherein the database part stores information:
coding an alphabet capital letter "A" by a permutation of code values N and -;
coding an alphabet capital letter "B" by a permutation of code values P and ɔ;
coding an alphabet capital letter "C" by a permutation of code values C and C;
coding an alphabet capital letter "D" by a permutation of code values ɾ and ɔ;
coding an alphabet capital letter "E" by a permutation of code values C and -;
coding an alphabet capital letter "F" by a permutation of code values - and P;
coding an alphabet capital letter "G" by a permutation of code values C and J;
coding an alphabet capital letter "H" by a permutation of code values P and ɾ;
coding an alphabet capital letter "I" by a permutation of code values ɾ and ɾ;
coding an alphabet capital letter "J" by a permutation of code values J and J;
coding an alphabet capital letter "K" by a permutation of code values ɾ and C;
coding an alphabet capital letter "L" by a permutation of code values ɾ and -;
coding an alphabet capital letter "M" by a permutation of code values N and \;
coding an alphabet capital letter "N" by a permutation of code values N and N;
coding an alphabet capital letter "O" by a permutation of code values o and o;
coding an alphabet capital letter "P" by a permutation of code values P and P;
coding an alphabet capital letter "Q" by a permutation of code values o and \;
coding an alphabet capital letter "R" by a permutation of code values P and \;
coding an alphabet capital letter "S" by a permutation of code values C and ɔ;
coding an alphabet capital letter "T" by a permutation of code values - and ɾ;
coding an alphabet capital letter "U" by a permutation of code values o and ɾ;
coding an alphabet capital letter "V" by a permutation of code values \ and z;
coding an alphabet capital letter "W" by a permutation of code values \ and N;
coding an alphabet capital letter "X" by a permutation of code values z and \ or a permutation of code values ɔ and C;
coding an alphabet capital letter "Y" by a permutation of code values \ and J or a permutation of code values o and J; and
coding an alphabet capital letter "Z" by a permutation of code values z and z.

4. The alphabet input apparatus of claim 1, wherein the database part stores information:
coding an alphabet small letter "a" by a permutation of code values C and \;
coding an alphabet small letter "b" by a permutation of code values ɾ and ɔ;
coding an alphabet small letter "c" by a permutation of code values C and C;
coding an alphabet small letter "d" by a permutation of code values C and ɾ;
coding an alphabet small letter "e" by a permutation of code values - and C;
coding an alphabet small letter "f" by a permutation of code values z and - or a permutation of code values J and -;
coding an alphabet small letter "g" by a permutation of code values C and J;
coding an alphabet small letter "h" by a permutation of code values P and ɾ;
coding an alphabet small letter "i" by a permutation of code values ɾ and ɾ;
coding an alphabet small letter "j" by a permutation of code values J and J;
coding an alphabet small letter "k" by a permutation of code values ɾ and C or a permutation of code values P and \;
coding an alphabet small letter "l" by a permutation of code values J and \;
coding an alphabet small letter "m" by a permutation of code values N and ɾ or a permutation of code values N and \;
coding an alphabet small letter "n" by a permutation of code values N and N or a permutation of code values ɾ and N;
coding an alphabet small letter "o" by a permutation of code values o and o;
coding an alphabet small letter "p" by a permutation of code values P and P;
coding an alphabet small letter "q" by a permutation of code values C and z;

coding an alphabet small letter "r" by a permutation of code values *I* and *Z*;
coding an alphabet small letter "s" by a permutation of code values C and Ↄ;
coding an alphabet small letter "t" by a permutation of code values - and *I*;
coding an alphabet small letter "u" by a permutation of code values O and *I*;
coding an alphabet small letter "v" by a permutation of code values \ and *Z* or a permutation of code values O and -;
coding an alphabet small letter "w" by a permutation of code values \ and N;
coding an alphabet small letter "x" by a permutation of code values *Z* and \ or a permutation of code values Ↄ and C;
coding an alphabet small letter "y" by a permutation of code values \ and J or a permutation of code values O and J; and
coding an alphabet small letter "z" by a permutation of code values *Z* and *Z*.

5. The alphabet input apparatus of claim 1, wherein the key input part further includes a shift key for shifting a capital letter to a small letter.

6. The alphabet input apparatus of claim 5, wherein the basic symbols allocated to the input keys are N, -, P, C, *I*, Ↄ, \, O, *Z*, and J.

7. The alphabet input apparatus of claim 6, wherein the database part stores information:
coding an alphabet capital letter "A" by a permutation of code values N and -;
coding an alphabet capital letter "B" by a permutation of code values P and Ↄ;
coding an alphabet capital letter "C" by a permutation of code values C and C;
coding an alphabet capital letter "D" by a permutation of code is values *I* and Ↄ;
coding an alphabet capital letter "E" by a permutation of coded values C and -;
coding an alphabet capital letter "F" by a permutation of code values - and P;
coding an alphabet capital letter "G" by a permutation of code values C and J;
coding an alphabet capital letter "H" by a permutation of code values P and *I*;
coding an alphabet capital letter "I" by a permutation of code values *I* and *I*;
coding an alphabet capital letter "J" by a permutation of code values J and J;
coding an alphabet capital letter "K" by a permutation of code values *I* and C;
coding an alphabet capital letter "L" by a permutation of code values *I* and -;
coding an alphabet capital letter "M" by a permutation of code values N and \;
coding an alphabet capital letter "N" by a permutation of code values N and N;
coding an alphabet capital letter "O" by a permutation of code to values O and O;
coding an alphabet capital letter "P" by a permutation of code values P and P;
coding an alphabet capital letter "Q" by a permutation of code values O and \;
coding an alphabet capital letter "R" by a permutation of code values P and \;
coding an alphabet capital letter "S" by a permutation of code values C and Ↄ;
coding an alphabet capital letter "T" by a permutation of code values - and *I*;
coding an alphabet capital letter "U" by a permutation of code values O and *I*;
coding an alphabet capital letter "V" by a permutation of code values \ and *Z*;
coding an alphabet capital letter "W" by a permutation of code values \ and N;
coding an alphabet capital letter "X" by a permutation of code values *Z* and \ or a permutation of code values Ↄ and C;
coding an alphabet capital letter "Y" by a permutation of code values \ and J or a permutation of code values O and J; and
coding an alphabet capital letter "Z" by a permutation of code values *Z* and *Z*,
and stores information:
coding an alphabet small letter "a" by a permutation of code values C and \;
coding an alphabet small letter "b" by a permutation of code values *I* and Ↄ;
coding an alphabet small letter "c" by a permutation of code values C and C;
coding an alphabet small letter "d" by a permutation of code values C and *I*;
is coding an alphabet small letter "e" by a permutation of code values - and C;
coding an alphabet small letter "f" by a permutation of code values *Z* and - or a permutation of code values J and -;
coding an alphabet small letter "g" by a permutation of code values C and J;
coding an alphabet small letter "h" by a permutation of code values P and *I*;
coding an alphabet small letter "i" by a permutation of code values *I* and *I*;
coding an alphabet small letter "j" by a permutation of code values J and J;
coding an alphabet small letter "k" by a permutation of code values *I* and C or a permutation of code values P and \;
coding an alphabet small letter "l" by a permutation of code values J and \;
coding an alphabet small letter "m" by a permutation of code values N and *I* or a permutation of code values N and \;
coding an alphabet small letter "n" by a permutation of code values N and N or a permutation of code values *I* and N;
coding an alphabet small letter "o" by a permutation of code values O and O;
coding an alphabet small letter "p" by a permutation of code values P and P;
coding an alphabet small letter "q" by a permutation of code values C and *Z*;

coding an alphabet small letter "r" by a permutation of code values ſ and Ƨ;

coding an alphabet small letter "s" by a permutation of code values C and Ɔ;

coding an alphabet small letter "t" by a permutation of code values - and ſ;

coding an alphabet small letter "u" by a permutation of code values O and ſ;

coding an alphabet small letter "v" by a permutation of code values \ and Ƨ or a permutation of code values O and -;

coding an alphabet small letter "w" by a permutation of code values \ and N;

coding an alphabet small letter "x" by a permutation of code values Ƨ and \ or a permutation of code values Ɔ and C;

coding an alphabet small letter "y" by a permutation of code values \ and J or a permutation of code values O and J; and coding an alphabet small letter "z" by a permutation of code values Ƨ and Ƨ, wherein one of the capital latter coding information and the small letter coding information is selected by a shift key code value generated by the shift key.

8. An alphabet input method comprising: generating first and second input key code values from input keys to which predetermined number of 10 basic symbols N, -, P, C, ſ, Ɔ, \, O, Ƨ, and J extracted by analyzing shapes of alphabet capital letters are allocated, respectively; setting a generation order of the two input key code values by a permutation of an input key code value; and determining an alphabet corresponding to a permutation of an input key code value generated from the input keys by reference to database part storing alphabet information coded by the permutation of the two input key code values.

9. The alphabet input method of claim 8, wherein the database part stores information:

coding an alphabet capital letter "A" by a permutation of code values N and -;

coding an alphabet capital letter "B" by a permutation of code values P and Ɔ;

coding an alphabet capital letter "C" by a permutation of code values C and C;

coding an alphabet capital letter "D" by a permutation of code values ſ and Ɔ;

coding an alphabet capital letter "E" by a permutation of code values C and -;

coding an alphabet capital letter "F" by a permutation of code values - and P;

coding an alphabet capital letter "G" by a permutation of code values C and J;

coding an alphabet capital letter "H" by a permutation of code values P and ſ;

coding an alphabet capital letter "I" by a permutation of code values ſ and ſ;

coding an alphabet capital letter "J" by a permutation of code values J and J;

coding an alphabet capital letter "K" by a permutation of code values ſ and C;

coding an alphabet capital letter "L" by a permutation of code values ſ and -;

coding an alphabet capital letter "M" by a permutation of code values N and \;

coding an alphabet capital letter "N" by a permutation of code values N and N;

coding an alphabet capital letter "O" by a permutation of code values O and O;

coding an alphabet capital letter "P" by a permutation of code values P and P;

coding an alphabet capital letter "Q" by a permutation of code values O and \;

coding an alphabet capital letter "R" by a permutation of code values P and \;

coding an alphabet capital letter "S" by a permutation of code values C and Ɔ;

coding an alphabet capital letter "T" by a permutation of code values - and ſ;

coding an alphabet capital letter "U" by a permutation of code values O and ſ;

coding an alphabet capital letter "V" by a permutation of code values \ and Ƨ;

coding an alphabet capital letter "W" by a permutation of code values \ and N;

coding an alphabet capital letter "X" by a permutation of code values Ƨ and \ or a permutation of code values Ɔ and C;

coding an alphabet capital letter "Y" by a permutation of code values \ and J or a permutation of code values O and J; and coding an alphabet capital letter "Z" by a permutation of code values Ƨ and Ƨ.

10. The alphabet input method of claim 8, wherein the database part stores information:

coding an alphabet small letter "a" by a permutation of code values C and \;

coding an alphabet small letter "b" by a permutation of code values ſ and Ɔ;

coding an alphabet small letter "c" by a permutation of code values C and C;

coding an alphabet small letter "d" by a permutation of code values C and ſ;

coding an alphabet small letter "e" by a permutation of code values - and C;

coding an alphabet small letter "f" by a permutation of code values Ƨ and - or a permutation of code values J and -;

coding an alphabet small letter "g" by a permutation of code values C and J;

coding an alphabet small letter "h" by a permutation of code values P and ſ;

coding an alphabet small letter "i" by a permutation of code values ſ and ſ;

coding an alphabet small letter "j" by a permutation of code values J and J;

coding an alphabet small letter "k" by a permutation of code values ſ and C or a permutation of code values P and \;

coding an alphabet small letter "l" by a permutation of code values J and \;

coding an alphabet small letter "m" by a permutation of code values N and ſ or a permutation of code values N and \;

coding an alphabet small letter "n" by a permutation of code values N and N or a permutation of code values I and N;

coding an alphabet small letter "o" by a permutation of code values O and O;

coding an alphabet small letter "p" by a permutation of code values P and P;

coding an alphabet small letter "q" by a permutation of code values C and Z;

coding an alphabet small letter "r" by a permutation of code values I and Z;

coding an alphabet small letter "s" by a permutation of code values C and ⊃;

coding an alphabet small letter "t" by a permutation of code values - and I;

coding an alphabet small letter "u" by a permutation of code values O and I;

coding an alphabet small letter "v" by a permutation of code values \ and Z or a permutation of code values O and -;

coding an alphabet small letter "w" by a permutation of code values \ and N;

coding an alphabet small letter "x" by a permutation of code values Z and \ or a permutation of code values ⊃ and C;

coding an alphabet small letter "y" by a permutation of code values \ and J or a permutation of code values O and J; and coding an alphabet small letter "z" by a permutation of code values Z and Z.

* * * * *